US011715893B2

(12) United States Patent
Kubota

(10) Patent No.: US 11,715,893 B2
(45) Date of Patent: Aug. 1, 2023

(54) STRUCTURE OF ELECTRICAL CONNECTION

(71) Applicant: Yazaki Corporation, Tokyo (JP)

(72) Inventor: Minoru Kubota, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 35 days.

(21) Appl. No.: 17/514,077

(22) Filed: Oct. 29, 2021

(65) Prior Publication Data

US 2022/0149546 A1 May 12, 2022

(30) Foreign Application Priority Data

Nov. 6, 2020 (JP) .................................. 2020-185776

(51) Int. Cl.
*H01R 11/09* (2006.01)
*H01R 4/30* (2006.01)
*H01R 4/70* (2006.01)

(52) U.S. Cl.
CPC ............... *H01R 11/09* (2013.01); *H01R 4/30* (2013.01); *H01R 4/70* (2013.01); *H01R 2201/26* (2013.01)

(58) Field of Classification Search
CPC ........ H01R 4/30; H01R 4/70; H01R 2201/26; H01R 11/288; H01R 11/09; H01M 50/507; H01M 50/505; H01M 50/503; H01M 50/502
See application file for complete search history.

(56) References Cited

U.S. PATENT DOCUMENTS

| 5,645,448 | A | * | 7/1997 | Hill | ...................... H01H 85/205 439/522 |
| 5,931,690 | A | | 8/1999 | Sai et al. | |
| 9,324,986 | B2 | * | 4/2016 | Ahn | ..................... H01M 50/553 |
| 10,516,149 | B2 | * | 12/2019 | Okazaki | .............. H01M 10/425 |
| 2015/0064524 | A1 | | 3/2015 | Noh et al. | |
| 2018/0145301 | A1 | | 5/2018 | Okazaki | |

FOREIGN PATENT DOCUMENTS

| EP | 2 546 906 A1 | 1/2013 |
| JP | 2014-179197 A | 9/2014 |
| JP | 2016-201179 A | 12/2016 |
| JP | 2017-121178 A | 7/2017 |

* cited by examiner

*Primary Examiner* — Briggitte R. Hammond
(74) *Attorney, Agent, or Firm* — Sughrue Mion, PLLC

(57) ABSTRACT

A structure of electrical connection is a structure of mutual electrical connection between a first power supply unit, a second power supply unit, and electric wires. The first power supply unit is provided with a first columnar terminal, and the second power supply unit is provided with a second columnar terminal. A tubular terminal is connected to an end of the electric wire. A first tubular terminal fitted to the first columnar terminal, a second tubular terminal fitted to the second columnar terminal, and a columnar terminal fitted to the tubular terminal are joined to a conductive connection plate. The entirety of the connection plate and the ends of the electric wires are covered with a cover.

9 Claims, 6 Drawing Sheets

STRUCTURE OF ELECTRICAL CONNECTION

BACKGROUND

Technical Field

The present invention relates to a structure of electrical connection between a power supply unit and electric wires mounted on an automobile.

Related Art

Power supply units through which a large current flows such as a power distribution box, a direct current/direct current (DC/DC) converter, and a direct current/alternate current (DC/AC) inverter are mounted in an automobile. For wiring of a power supply circuit including these power supply units, large-diameter electric wires and bus bars have been used (see, for example, JP 2017-121178 A).

A structure of electrical connection 500 illustrated in FIGS. 5 and 6 is a conventional structure of electrical connection between a first power supply unit 501, a second power supply unit 502, and electric wires 503.

The first power supply unit 501 is provided with stud bolt type terminals 511 protruding from an upper surface of a housing of the first power supply unit 501. Similarly, the second power supply unit 502 is provided with stud bolt type terminals 521 protruding from an upper surface of a housing of the second power supply unit 502. A nut 506 is screwed to each of these stud bolt type terminals 511 and 521.

Since a large current flows through the electric wire 503, a round terminal (LA terminal) 505 is crimped to an end of the electric wire 503. The round terminal 505 is attached to the stud bolt type terminal 521 of the second power supply unit 502 and the nut 506 is screwed to the stud bolt type terminal 521, whereby the round terminal 505 is fixed to the stud bolt type terminal 521.

The first power supply unit 501 and the second power supply unit 502 are arranged close to each other and are electrically connected to each other by bus bars 504. In the bus bar 504, a through-hole 541 through which the stud bolt type terminal 511 passes and a through-hole 542 through which the stud bolt type terminal 521 passes are formed.

In a state in which the stud bolt type terminals 511 and 521 pass through the through-holes 541 and 542 of the bus bar 504, respectively and furthermore the stud bolt type terminal 521 passes through a through-hole of the round terminal 505, the nuts 506 are screwed to the stud bolt type terminals 511 and 521, whereby the first power supply unit 501, the second power supply unit 502, and the electric wires 503 are mutually electrically connected to each other.

Patent Literature 1: JP 2017-121178 A

SUMMARY

In the conventional structure of electrical connection 500 described above, the work of screwing the nut 506 for each terminal is complicated, and it is necessary to manage tightening force (torque) for each nut 506.

Therefore, an object of the present invention is to provide a structure of electrical connection capable of simplifying work of connecting between a plurality of power supply units and electric wires.

The present invention is a structure of electrical connection which is a structure of mutual electrical connection between a first power supply unit, a second power supply unit, and electric wires, in which a first columnar terminal is provided on the first power supply unit, a second columnar terminal is provided on the second power supply unit, the structure of electrical connection includes a conductive connection plate configured to be electrically connected to the electric wires, and a first tubular terminal fitted to the first columnar terminal and a second tubular terminal fitted to the second columnar terminal are joined to the connection plate.

According to the present invention, work of connecting between the first power supply unit, the second power supply unit, and the electric wires can be simplified.

DETAILED DESCRIPTION

With reference to FIGS. 1 to 4, a "structure of electrical connection" according to an embodiment of the present invention will be described.

Figure 1:
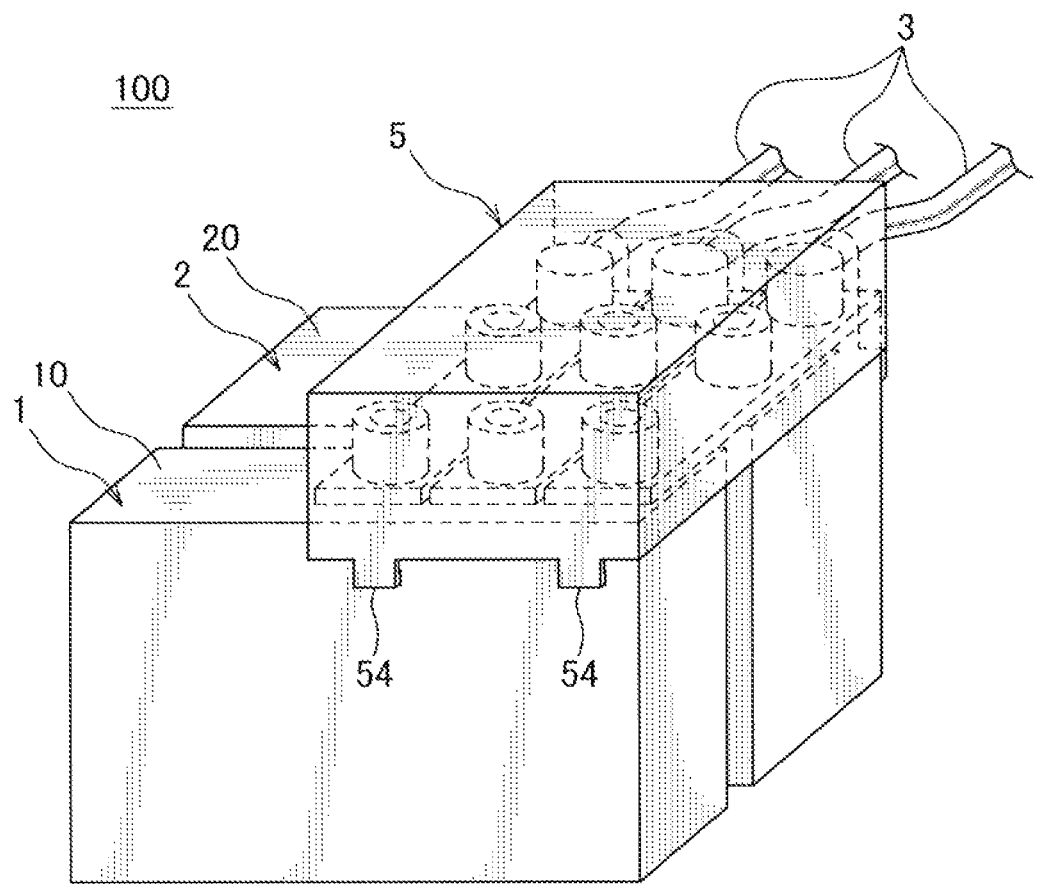
FIG. 1 is a perspective view of a structure of electrical connection according to an embodiment of the present invention.
Figure 2:
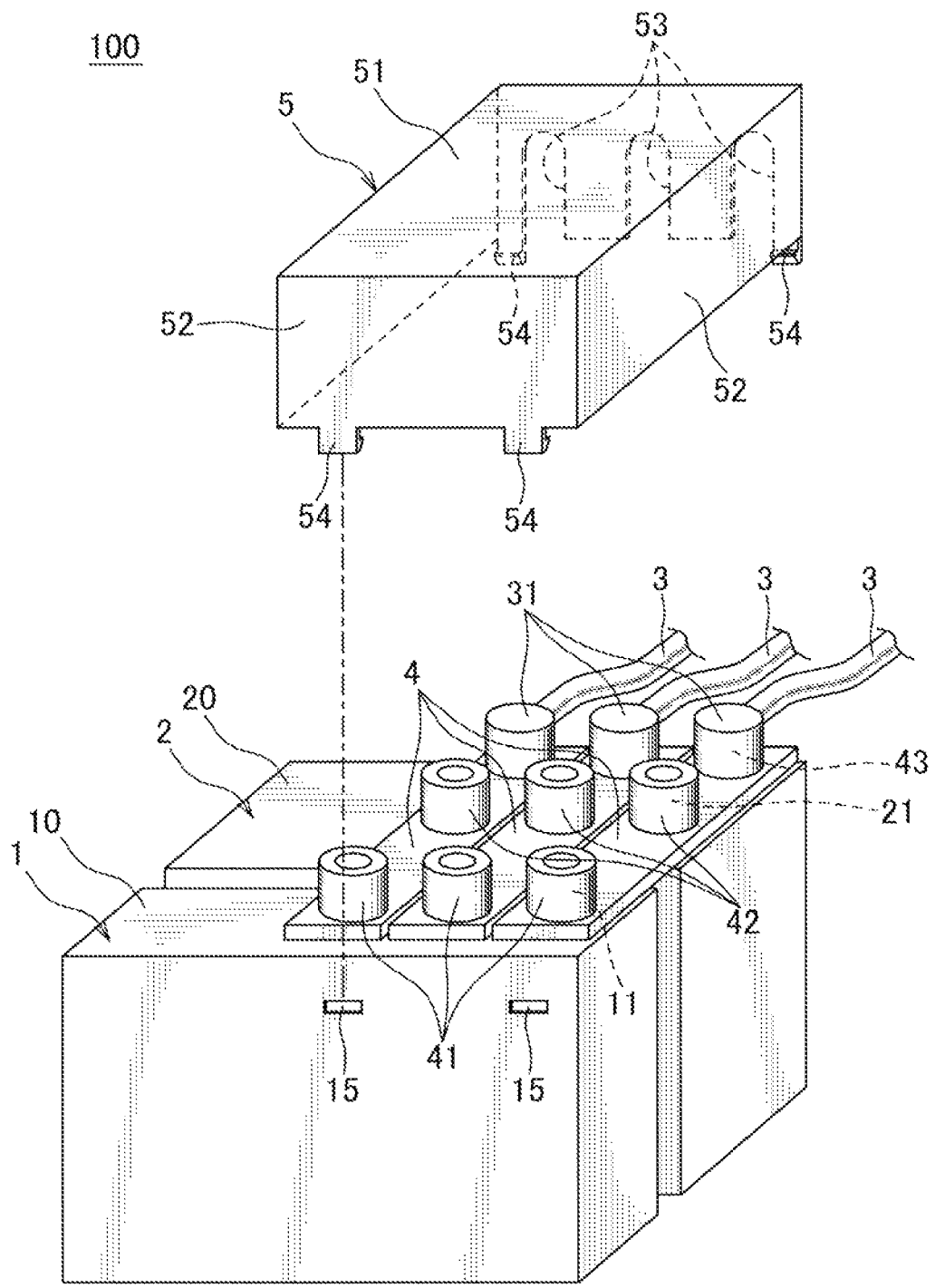
FIG. 2 is a view of the structure of electrical connection in FIG. 1 from which a cover is removed.
Figure 3:
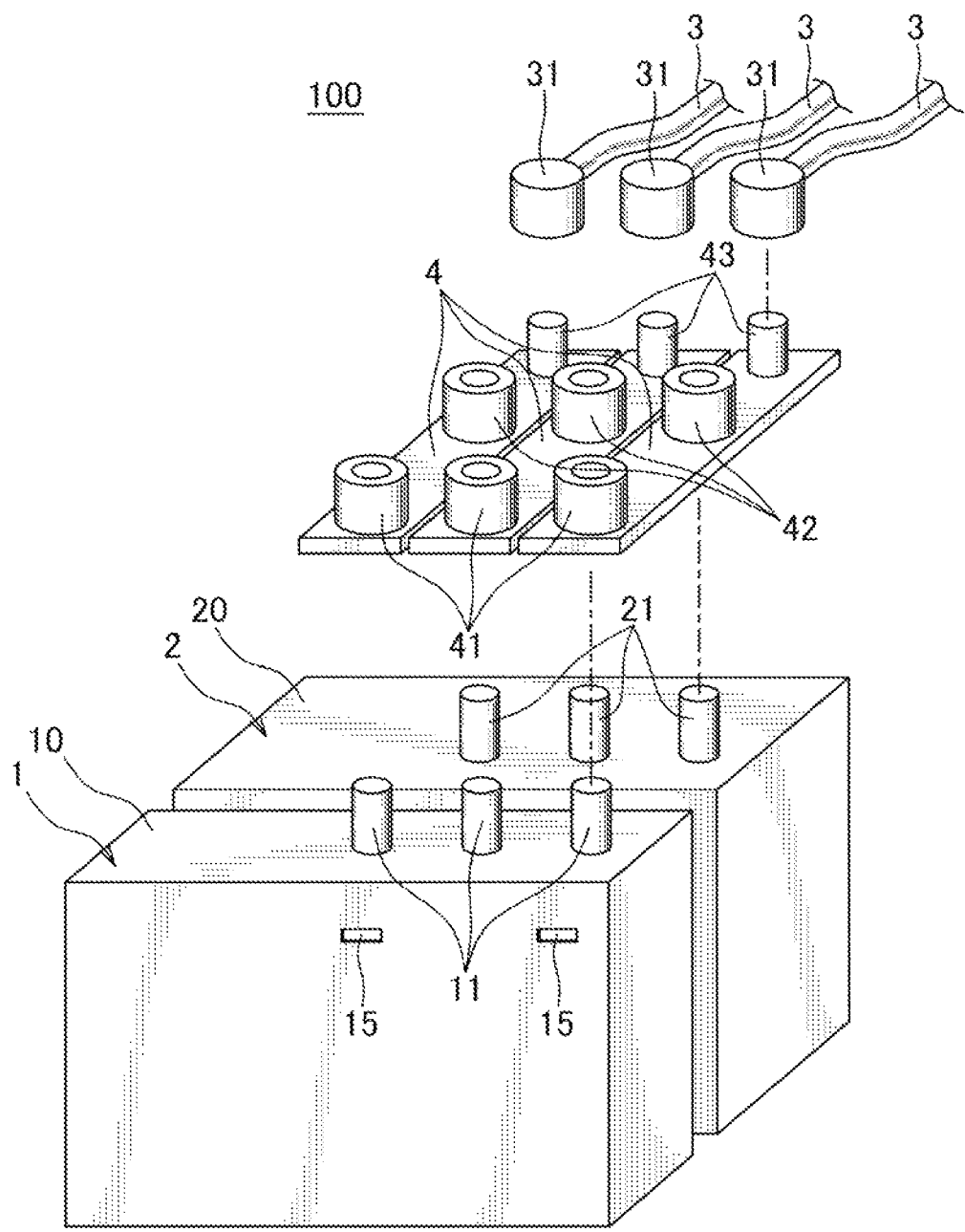
FIG. 3 is an exploded view of the structure of electrical connection in FIG. 2.

The structure of electrical connection 100 illustrated in FIGS. 1 to 3 is a structure of mutual electrical connection between a first power supply unit 1, a second power supply unit 2, and electric wires 3. The first power supply unit 1 and the second power supply unit 2 are power supply units mounted on an automobile and are, for example, power supply units through which a large current flows such as a power supply distribution box, a DC/DC converter, a DC/AC inverter, and the like. The electric wire 3 is a large-diameter power supply wire. In addition, since the structure of electrical connection 100 of the present example includes three power supply circuits, three electric wires 3 are used.

The first power supply unit 1 is provided with a first columnar terminal 11 protruding from an upper surface of a housing 10 of the first power supply unit 1. The first columnar terminal 11 is formed in a columnar shape. Similarly, the second power supply unit 2 is provided with a second columnar terminal 21 protruding from an upper surface of a housing 20 of the second power supply unit 2. The second columnar terminal 21 is formed in a columnar shape. In addition, as described above, since the structure of electrical connection 100 of the present example includes the three power supply circuits, three first columnar terminals 11 and three second columnar terminals 21 are provided.

A tubular terminal 31 is connected to an end of each electric wire 3. Although schematically illustrated in illustrated examples, the tubular terminal 31 of the present example has a cylindrical fitting portion to be fitted to a columnar terminal 43 to be described later, and a caulking portion obtained by caulking a core wire of the electric wire 3. This caulking portion is not an essential configuration in the tubular terminal 31, and the tubular terminal 31 may be joined to the core wire of the electric wire 3 by welding or the like.

The first columnar terminal 11 of the first power supply unit 1, the second columnar terminal 21 of the second power supply unit 2, and the tubular terminal 31 of the electric wire 3 are configured to be electrically connected via a conductive connection plate 4. In addition, since the structure of electrical connection 100 of the present example includes the three power supply circuits, three connection plates 4 are used.

The connection plate 4 is formed in a flat plate shape, and on the connection plate 4, a first through-hole through which the first columnar terminal 11 passes and a second through-hole through which the second columnar terminal 21 passes are formed. A first tubular terminal 41 fitted to the first columnar terminal 11 is joined to an outer peripheral portion of the first through-hole. The first tubular terminal 41 is formed in a cylindrical shape. A second tubular terminal 42 fitted to the second columnar terminal 21 is joined to an outer peripheral portion of the second through-hole. The second tubular terminal 42 is formed in a cylindrical shape. Furthermore, the columnar terminal 43 fitted to the tubular terminal 31 of the electric wire 3 is joined to the connection plate 4. The columnar terminal 43 is formed in a columnar shape.

The first tubular terminal 41, the second tubular terminal 42, and the columnar terminal 43 are joined to the same surface of the connection plate 4. In the present example, the first tubular terminal 41, the second tubular terminal 42, and the columnar terminal 43 are joined to the connection plate 4 by welding but may be joined to the connection plate 4 by caulking. As described above, the first tubular terminal 41, the second tubular terminal 42, and the columnar terminal 43 are firmly joined to the connection plate 4 by welding, caulking, or the like, whereby it is possible to ensure high connection reliability in terms of strength as well as electrically (vibration resistance is excellent and resistance is low).

As for the first columnar terminal 11 and the first tubular terminal 41, there is provided a spring structure that is in multifaceted contact (multi-contact) with the first columnar terminal 11 and maintains a fitting state on a side of the first tubular terminal 41. Similarly, also as for the second columnar terminal 21 and the second tubular terminal 42, there is provided a spring structure that is in multifaceted contact with the second columnar terminal 21 and maintains a fitting state on a side of the second tubular terminal 42. Also as for the tubular terminal 31 and the columnar terminal 43, there is provided a spring structure that is in multifaceted contact with the columnar terminal 43 and maintains a fitting state on a side of the tubular terminal 31.

In addition, the structure of electrical connection 100 includes a cover 5 that covers the entirety of the connection plate 4 and the ends of the electric wires 3. The cover 5 includes an insulating synthetic resin and is formed in a box shape having an upper surface 51 and side surfaces 52. Three cutouts 53 through each of which one of the three electric wires 3 passes are formed on one side surface 52. In addition, locking claws 54 extend from lower ends of a pair of the side surfaces 52 opposing each other. These locking claws 54 are locked to locking portions 15 formed on the housing 10 of the first power supply unit 1 and locking portions formed on the housing 20 of the second power supply unit 2. As a result, the cover 5 is fixed to the first power supply unit 1 and the second power supply unit 2. The cover 5 prevents detachment of the connection plate 4 and detachment of the tubular terminal 31 of the electric wire 3 from the connection plate 4.

Figure 4:
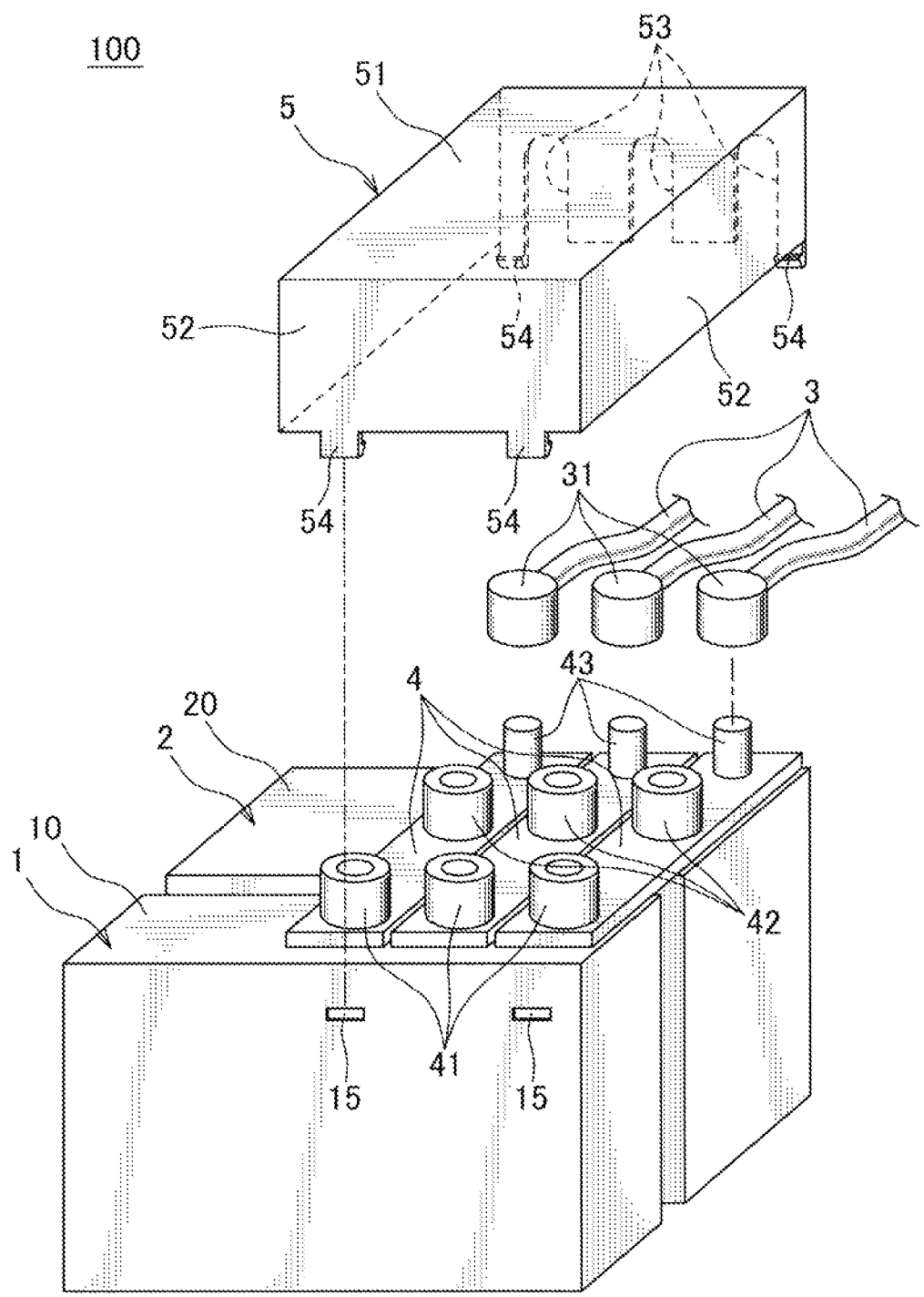
FIG. 4 is a diagram for describing a connection procedure of the structure of electrical connection in FIG. 1.
Figure 5:
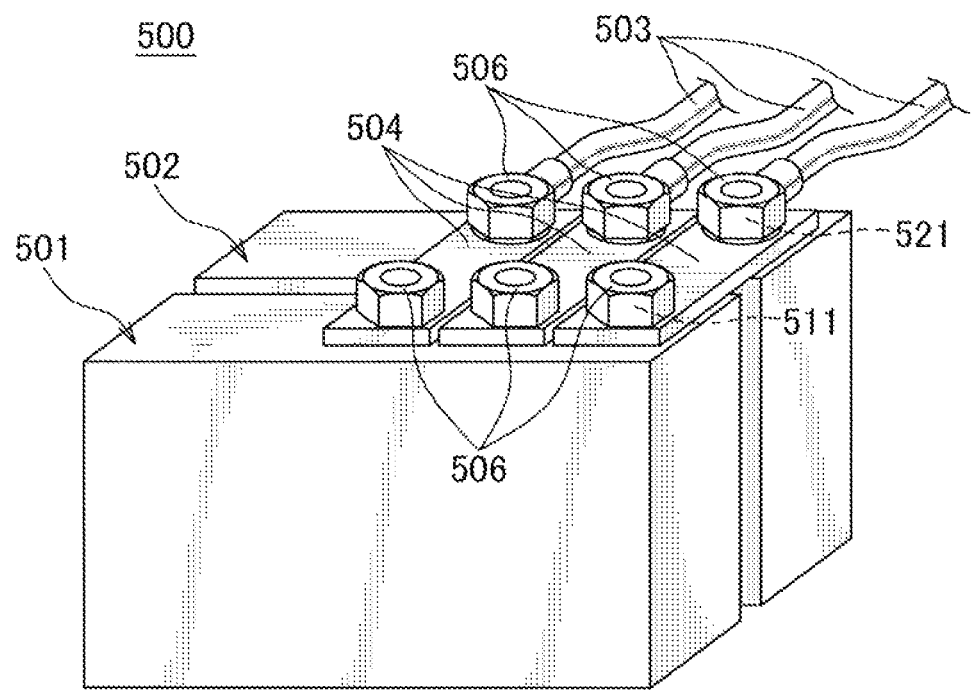
FIG. 5 is a perspective view of a conventional structure of electrical connection.
Figure 6:
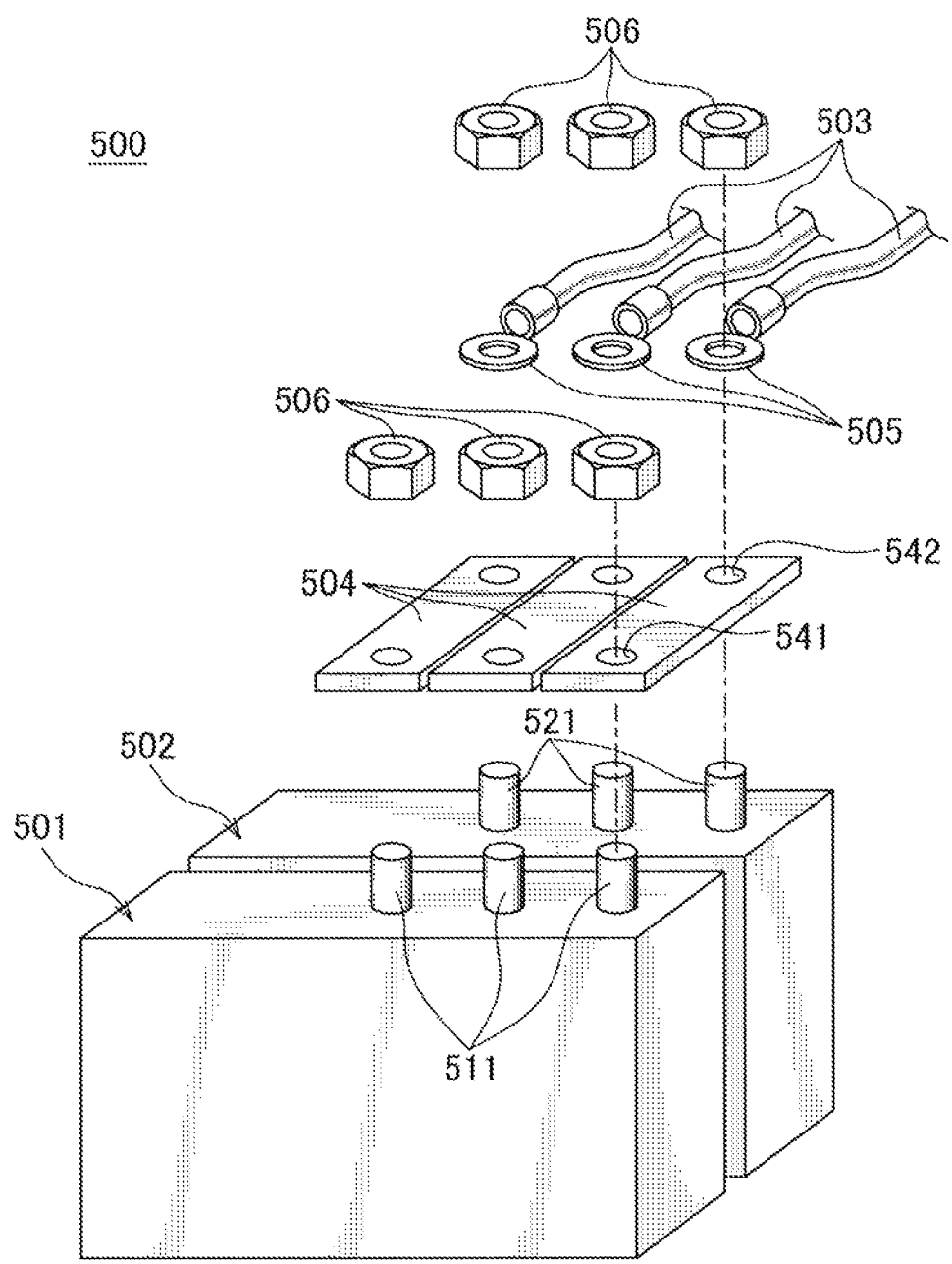
FIG. 6 is an exploded view of the structure of electrical connection in FIG. 5.

An example of a connection procedure of the structure of electrical connection 100 described above will be described. First, as illustrated in FIG. 4, the connection plate 4 is attached to the first power supply unit 1 and the second power supply unit 2 that are aligned. This work does not require tools and special equipment, and it is only necessary to set the connection plate 4 on the first power supply unit 1 and the second power supply unit 2 and lightly push the connection plate 4. By pushing the connection plate 4, the first columnar terminal 11 and the first tubular terminal 41 are fitted to each other, and the second columnar terminal 21 and the second tubular terminal 42 are fitted to each other. As a result, the first columnar terminal 11 and the second columnar terminal 21 are electrically connected. This work is performed as many times as the number of the circuits, that is, three times, and three connection plates 4 are attached.

Next, the tubular terminal 31 of the electric wire 3 is fitted to the columnar terminal 43 of the connection plate 4, and the electric wire 3 is electrically connected to the first columnar terminal 11 and the second columnar terminal 21. This work also does not require tools and special equipment, and it is only necessary to lightly push the tubular terminal 31 toward a side of the columnar terminal 43. This work is performed as many times as the number of the circuits, that is, three times, and the three electric wires 3 are electrically connected. Finally, the cover 5 is attached to the first power supply unit 1 and the second power supply unit 2, whereby all the work is completed.

As described above, in the structure of electrical connection 100, all the electrical connection work can be easily performed with less effort. In addition, since there is no work of screwing nuts, torque management is unnecessary, and there is almost no variation in work quality.

In the embodiment described above, the tubular terminal 31 is connected to the end of the electric wire 3, but a columnar terminal may be connected to the end of the electric wire 3, and a tubular terminal may be joined to the connection plate 4. In addition, the electric wire 3 may be directly joined to the connection plate 4 by welding or the like.

In the embodiment described above, the structure of mutual electrical connection between the first power supply unit, the second power supply unit, and the electric wires has been described, but the structure of electrical connection of the present invention can also be applied to a structure of mutual electrical connection of three or more power supply units and electric wires.

It should be noted that the embodiment described above merely illustrates a representative form of the present invention, and the present invention is not limited to the embodiment. That is, various modifications can be made without departing from the gist of the present invention. It is obvious that such modifications are included in the scope of the present invention as long as the modifications still have the features of the present invention.

REFERENCE SIGNS LIST

1 First power supply unit
2 Second power supply unit
3 Electric wire
4 Connection plate
5 Cover 11 First columnar terminal
12 Second columnar terminal
31 Tubular terminal
41 First tubular terminal
42 Second tubular terminal
43 Columnar terminal
100 Structure of electrical connection

What is claimed is:

1. A structure of electrical connection which is a structure of mutual electrical connection between a first power supply unit, a second power supply unit, and an electric wire, comprising;
    a first columnar terminal provided on the first power supply unit;
    a second columnar terminal provided on the second power supply unit;
    a conductive connection plate configured to be electrically connected to the electric wire; and
    a first tubular terminal to be fitted to the first columnar terminal and a second tubular terminal to be fitted to the second columnar terminal, the first tubular terminal and the second tubular terminals being joined to the connection plate by welding or calking.

2. The structure of electrical connection according to claim 1, wherein
    one of a columnar terminal and a tubular terminal is configured to be connected to an end of the electric wire, the other of the columnar terminal and the tubular terminal is joined to the connection plate, the columnar terminal and the tubular terminal are configured to be fitted to each other to electrically connect the electric wire to the connection plate.

3. The structure of electrical connection according to claim 1, wherein
    the connection plate is formed in a flat shape,
    a first through-hole for inserting the first columnar terminal therethrough and a second through-hole for inserting the second columnar terminal therethrough are formed in the connection plate,
    the first tubular terminal is joined to an outer peripheral portion of the first through-hole,
    the second tubular terminal is joined to an outer peripheral portion of the second through-hole, and
    the first tubular terminal and the second tubular terminal are joined to the same surface of the connection plate.

4. The structure of electrical connection according to claim 2, wherein
    the connection plate is formed in a flat shape,
    a first through-hole for inserting the first columnar terminal therethrough and a second through-hole for inserting the second columnar terminal therethrough are formed in the connection plate,
    the first tubular terminal is joined to an outer peripheral portion of the first through-hole,
    the second tubular terminal is joined to an outer peripheral portion of the second through-hole, and
    the first tubular terminal and the second tubular terminal are joined to the same surface of the connection plate.

5. The structure of electrical connection according to claim 1, further comprising a cover that covers an entirety of the connection plate and an end of the electric wire.

6. The structure of electrical connection according to claim 2, further comprising a cover that covers an entirety of the connection plate and an end of the electric wire.

7. The structure of electrical connection according to claim 3, further comprising a cover that covers an entirety of the connection plate and an end of the electric wire.

8. The structure of electrical connection according to claim 4, further comprising a cover that covers an entirety of the connection plate and an end of the electric wire.

9. The structure of electrical connection according to claim 1, wherein the first tubular terminal and the second tubular terminal include spring structures configured to maintain a fitting state in which the first tubular terminal and the second tubular terminal are fitted to the first columnar terminal and the second columnar terminal.

* * * * *